US012594731B2

(12) United States Patent
Korn et al.

(10) Patent No.: US 12,594,731 B2
(45) Date of Patent: Apr. 7, 2026

(54) DEVICE AND METHOD FOR JOINING TOGETHER TWO JOINING PARTNERS

(71) Applicant: Continental Autonomous Mobility Germany GmbH, Ingolstadt (DE)

(72) Inventors: Martin Korn, Neuburg (DE); Steffen Nahm, Rennertshofen (DE); Josef Gehring, Eichstätt (DE); Simon Unterseher, Dollnstein (DE); Bernhard Apelsmeier, Pollenfeld (DE); Alexander Reger, Ingolstadt (DE); Udo Murmann, Eppertshausen (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 251 days.

(21) Appl. No.: 18/684,029

(22) PCT Filed: Aug. 16, 2022

(86) PCT No.: PCT/DE2022/200186
§ 371 (c)(1),
(2) Date: Feb. 15, 2024

(87) PCT Pub. No.: WO2023/020669
PCT Pub. Date: Feb. 23, 2023

(65) Prior Publication Data
US 2025/0050593 A1 Feb. 13, 2025

(30) Foreign Application Priority Data
Aug. 20, 2021 (DE) ..................... 10 2021 209 203.9

(51) Int. Cl.
*B29C 65/06* (2006.01)
*B29C 65/00* (2006.01)
(Continued)

(52) U.S. Cl.
CPC .......... *B29C 65/7885* (2013.01); *B29C 65/16* (2013.01); *B29C 66/9121* (2013.01)

(58) Field of Classification Search
CPC . B29C 65/7885; B29C 65/16; B29C 65/7847; B29C 65/7882; B29C 65/80
See application file for complete search history.

(56) References Cited

U.S. PATENT DOCUMENTS

| | | | |
|---|---|---|---|
| 3,207,049 A | 9/1965 | Monroe et al. | |
| 4,861,404 A | 8/1989 | Neff | |

(Continued)

FOREIGN PATENT DOCUMENTS

| | | |
|---|---|---|
| CN | 107471657 A | 12/2017 |
| DE | 3505272 A1 | 3/1986 |

(Continued)

OTHER PUBLICATIONS

Klein "Laser Welding of Plastics", 2012, 9783527409723, Weinheim : Wiley-VCH, pp. 118-121.

(Continued)

*Primary Examiner* — Daniel McNally
(74) *Attorney, Agent, or Firm* — Buchanan Ingersoll & Rooney PC

(57) ABSTRACT

A device for joining together two joining partners includes a first component receptacle for receiving the first joining partner and a second component receptacle for receiving the second joining partner. The first component receptacle and the second component receptacle are rotatable about a first axis of rotation and a second axis of rotation, respectively. The first axis of rotation and the second axis of rotation are perpendicular to each other.

12 Claims, 3 Drawing Sheets

(51) Int. Cl.
    *B29C 65/16*         (2006.01)
    *B29C 65/78*         (2006.01)

(56)            References Cited

U.S. PATENT DOCUMENTS

| | | | |
|---|---|---|---|
| 2005/0017413 A1 | 1/2005 | Gram | |
| 2007/0047796 A1* | 3/2007 | Anantharaman | B29C 66/612 |
| | | | 228/103 |
| 2015/0273808 A1* | 10/2015 | Thompson | B29C 66/944 |
| | | | 156/272.8 |

FOREIGN PATENT DOCUMENTS

| | | | |
|---|---|---|---|
| DE | 3873215 | T2 | 12/1992 |
| DE | 10351527 | A1 | 6/2005 |
| EP | 0756993 | A1 | 2/1997 |
| EP | 1173321 | A1 | 1/2002 |
| EP | 1469983 | A1 | 10/2004 |
| JP | H04258328 | A | 9/1992 |
| JP | H11320718 | A | 11/1999 |
| WO | 0043190 | A1 | 7/2000 |
| WO | 03059596 | A1 | 7/2003 |
| WO | 2007147935 | A1 | 12/2007 |

OTHER PUBLICATIONS

Klein "Laserstrahlschweißen transparenter und farbiger Kunststoffe; Innovatives Verfahre ermöglicht transparente Verbindung", Kunststoffschweissen, www.laser-journal.de, 2007, Nr. 4, pp. 41-44.

Wissemborski et al. "Welding and Marking of Plastics with Lasers New absorbers increase possibilities for application" 2010 WILEY. VCH Verlag Gmb4 & Co. KGaA, Weinheim; www.laser-journal.de; 19-22; https://doi.org/10.1002/latj.201090070, pp. 19-22.

Klein "laserwelding of plastics, Process of Laser Plastic Welding", Seiten 141 bis 159; laser Welding of Plastics, 2011, pp. 141-159.

Search Report dated Nov. 24, 2021 from corresponding German patent application No. 10 2021 209 203.9.

International Search Report and Written Opinion dated Nov. 7, 2022 from corresponding International patent application No. PCT/DE2022/200186.

International Search Report and Written Opinion dated Nov. 22, 2022 from corresponding International patent application No. PCT/DE2022/200186.

Office Action dated Dec. 16, 2021 from corresponding German patent application No. 10 2021 209 203.9.

Notice of Allowance dated Jan. 13, 2022 from corresponding German patent application No. 10 2021 209 203.9.

Notice of Allowance dated Dec. 21, 2022 from corresponding German patent application No. 10 2021 209 203.9.

Notice of Reasons for Refusal drafted Dec. 17, 2024 for the counterpart Application number: Japanese Patent Application No. 2024-504571 and translation of same.

\* cited by examiner (B)

(C)

DEVICE AND METHOD FOR JOINING TOGETHER TWO JOINING PARTNERS

CROSS-REFERENCE TO RELATED APPLICATIONS

This application is a National Stage Application under 35 U.S.C. 371 of International Patent Application No. PCT/DE2022/200186 filed on Aug. 16, 2022, which claims priority from German Patent Application No. DE 102021209203.9 filed on Aug. 20, 2021, in the German Patent and Trade Mark Office, the disclosures of which are herein incorporated by reference in their entireties.

BACKGROUND

1. Field

Embodiments of the present application relate to a device and a method for joining together two joining partners, and in particular to a device and a method for joining together two joining partners by quasi-simultaneous laser welding of plastic parts.

2. Description of Related Art

Nowadays, plastics or plastic parts or workpieces or semi-finished products made of plastic are particularly important in production. Such plastic parts are deployed in the most diverse fields of technology such as, e.g., in the field of automotive engineering, robotics, machine production, household appliance technology and the like. In this case, it is often necessary to connect two or more plastic parts to one another in individual production steps. This can be done, for example, by an adhesive connection or a mechanical fastening solution, such as, e.g., by screws, rivets or clips. However, welding is increasingly deployed in order, in particular, to connect or join, e.g., two components or joining partners to one another in a non-detachable way. In this case, there are different welding methods which can be deployed such as, e.g., laser welding, hot gas welding, by means of a hot plate, infrared welding, ultrasonic welding or friction welding.

In the case of hot gas welding, the two joining partners to be welded are, as a general rule, each inserted into a product-specific workpiece carrier. So-called feed units open and the actual welding process is initiated by extending the heating element into the heating position. This is followed by the diathermic (through-heating) phase in which the connection region or the joining zone is plasticized by radiant heat. The heat transfer from the heating element to the weld seam is forced by a hot flow of inert gas. After the necessary heat of melting has been applied to the plastic part, the feeds move so far apart that the heating element can travel from the working position into the parking position. The actual joining process is now carried out by closing the supply units so that the plasticized, weld-defined geometries can be welded to one another. The specified joining path is monitored and consequently ensures the correct final dimension of the welded parts.

Furthermore, two plastic parts can also be welded to one another by means of a heated die plate, wherein a welding rib or bead on joining partners opposite one another is brought into contact with a heated tool, the hot plate. The heat is conducted into the welding rib and makes the latter melt. The hot plate is then removed and the joining partners are pressed together until they connect to one another. In the case of infrared welding (IR welding), the joining partners are held rigidly in the vicinity of an infrared-emitting plate in order to melt the joining surfaces. The plate is removed and the halves of the parts are forced together and can resolidify under pressure. The disadvantages of hot gas welding, the hot plate and infrared welding according to the prior art are their high technology costs and the fact that heat cannot be selectively provided to welding interfaces. In addition, long cycle times are required, and a large amount of energy is needed.

In the case of ultrasonic welding, the necessary welding heat is produced by pressure and ultrasonic oscillation between the parts to be connected. Following plasticization, the molten plastic solidifies under pressure, as a result of which a homogeneous welded joint is created. However, said method is not suitable for assemblies having electronics inside since these can be damaged by the ultrasound. In addition, particles which can lead to increased contamination including, e.g., of the electronic component parts are produced. In the case of friction welding, the necessary welding heat is produced by pressure and friction between the parts to be connected. Following plasticization, the molten plastic material becomes stiff and produces a homogeneous welded joint. However, friction welding is not suitable either for some assemblies having electronics inside, as particles are likewise produced.

The basic principle of laser welding is a laser beam which penetrates a laser-transparent joining partner and is focused on an absorbent joining partner. The laser beam is converted into heat and plasticizes the material. The increasing volume contacts the transparent partner. The transparent joining partner is plasticized locally by the resulting heat conduction. In order to obtain good thermal conductivity between the two joining partners and ultimately a welded joint, a fixing plate must, as a general rule, be attached, which presses together both joining partners during the laser exposure. Consequently, the method for laser welding plastics requires a laser-transparent joining partner and a laser-absorbing joining partner. The fact that one of the joining parts or one joining partner has to be laser-transparent can lead to increased manufacturing costs, since laser-transparent plastics are often expensive, in particular if the plastic parts are to be designed, e.g., to be black.

A laser welding method for non-transmissive welding of thermoplastic plastics, in which two non-transparent components are welded by laser, wherein these are, however, held together under pressure during the welding process, is known from CN 107 471 657 A. In the case of the laser welding method, an upper plastic part which is to be welded and a lower plastic part which is to be welded are positioned in such a way that the upper plastic module and the lower plastic module are stacked and pressed together by pressure. A laser beam is then focused on the upper plastic part such that a warming region is formed. The laser beam is then adjusted so that the temperature of the warming region is lower than the melting point of the upper plastic part, but is higher than the melting point of the lower plastic part, so that the heat of the warming region is radiated to the lower plastic module and melted accordingly so that the latter is then connected under the effect of the pressure to the upper plastic part.

Accordingly, it would be preferable to make available a device and a method for joining together plastic parts, with which plastic parts can be connected to one another, in particular for assemblies having electronic component parts inside, in a simple, efficient and cost-effective manner, and with which the disadvantages from the prior art are overcome.

SUMMARY

According to an aspect of an embodiment, there is provided a device for joining together two joining partners, in particular for welding the joining partners by means of a heat input or for quasi-simultaneous laser welding of plastic parts. To this end, the device comprises a first heat source which is arranged in order to heat a joining surface of the first joining partner, and a second heat source which is arranged in order to heat a joining surface of the second joining partner. Furthermore, a first component receptacle for receiving the first joining partner and a second component receptacle for receiving the second joining partner are provided, wherein the first component receptacle is arranged so as to be rotatable about a first axis of rotation and the second component receptacle is arranged so as to be rotatable about a second axis of rotation. The first component receptacle is at least arranged substantially perpendicularly or orthogonally to the second component receptacle such that the first axis of rotation and the second axis of rotation are also arranged substantially perpendicularly to one another. In addition, the first component receptacle has a heating position in which the first joining partner is arranged with respect to the first heat source in such a way that the joining surface of the first joining partner can be heated by the first heat source. Accordingly, the second component receptacle also has a heating position in which the second joining partner is arranged with respect to the second heat source in such a way that the joining surface of the second joining partner can be heated by the second heat source. The device can then join together the first and the second joining partner in particular after heating in that a joining position is provided in which the joining surfaces of the first and the second joining partner are arranged opposite one another, and the first component receptacle is or can be rotated about the first axis of rotation such that the first joining partner is situated in the joining position, and the second component receptacle is or can be rotated about the second axis of rotation such that the second joining partner is also situated in the joining position. The joining surfaces are joined together in that a joining unit is provided, which can move the first component receptacle or a part of the first component receptacle or the second component receptacle or a part of the second component receptacle (e.g., the first component receptacle or a part of the first component receptacle can be moved toward the second component receptacle or the second component receptacle or a part of the second component receptacle can be moved toward the first component receptacle), wherein the joining surfaces are or can be brought into contact by the movement of the joining unit.

The joining surfaces can preferably be brought together in that the joining unit moves the first component receptacle or a part of the first component receptacle in the direction along the first axis of rotation or along the second axis of rotation, so that the joining surface of the first joining partner is brought into contact with the joining surface of the second joining partner.

Alternatively or additionally, the joining surfaces can also be brought together in that the or a joining unit moves the second component receptacle or a part of the second component receptacle in the direction along the first axis of rotation or along the second axis of rotation, so that the joining surface of the first joining partner is brought into contact with the joining surface of the second joining partner.

A laser is preferably provided as the first heat source and/or a laser is preferably provided as the second heat source. Moreover, all of the devices known from the prior art, which are suitable for warming the joining surfaces, can also be provided as the heat source.

Furthermore, the component receptacles can each receive multiple joining partners, in particular two or four joining partners or more each. Accordingly, the component receptacles can also have multiple component seats. This results in the advantage that the joining partners can be loaded, heated, joined together and unloaded in parallel or quasi-simultaneously.

According to an aspect of an embodiment, the component receptacle can comprise a turntable or rotary table which is arranged so as to be rotatable about the axis of rotation. The turntable can have any form (round, square, hexagonal or the like) and any thickness. Furthermore, the turntable can be driven, e.g., via an electric motor, in particular a servomotor, or via a hydraulic control.

The component receptacle can expediently comprise at least one component seat for receiving a joining partner.

Advantageously, the component seat can comprise a suitable component fixing for receiving purposes, in particular, a vacuum suction cap, a magnet mechanism or a clamping device, in order to hold the component or the joining partner securely. Furthermore, it is thereby possible that the components can also be transported "overhead" on the turntable without detaching from the component seat.

The joining unit preferably comprises a piston which contacts the turntable or the component seat, and a joining force is transmitted to the piston so that the turntable and/or the component seat is moved in the direction along the first axis of rotation.

The joining unit can expediently comprise a motor-driven or a hydraulic drive.

According to an aspect of an embodiment, one component receptacle can be arranged horizontally and one component receptacle can be arranged vertically.

Furthermore, two component receptacles arranged vertically and opposite one another can also be provided. Accordingly, an additional heat source can also be provided for the additional second vertical component receptacle.

A separate monitoring system, in particular a thermal imaging camera, can be expediently provided for each heat source in order to monitor the heating-up of the joining partners separately. This results in the advantage that the monitoring can take place particularly precisely, since each component is monitored individually and faults can be responded to individually (e.g., only the power in one heat source is modified).

Furthermore, the component receptacles can each have their own joining unit, wherein the joining surfaces of the joining partners are brought together in that each joining unit moves the respective component receptacle or a part thereof such that the joining surfaces are brought into contact by the movement of the joining units. This results in the advantage that it is possible to make a saving in terms of the cycle time, wherein, e.g., the heating-up phase or the warming can be shortened.

According to an aspect of an embodiment, there is provided a method for joining together two joining partners, including: loading a first component receptacle with the first joining partner and loading a second component receptacle with the second joining partner; positioning the first component receptacle about a first axis of rotation in a heating position in which the first joining partner is arranged with respect to the second heat source in such a way that the joining surface of the first joining partner is heated by the first heat source and positioning the second component receptacle about a second axis of rotation in a heating position in which the second joining partner is arranged with respect to the second heat source in such a way that the joining surface of the second joining partner is heated by the second heat source; warming in that a first heat source is provided or arranged in order to heat the joining surface of the first joining partner, and a second heat source is arranged in order to heat the joining surface of the second joining partner; rotating the first component receptacle about the first axis of rotation such that the first joining partner is situated in a joining position, and rotating the second component receptacle about the second axis of rotation such that the second joining partner is also situated in a joining position, wherein the joining surfaces of the first and the second joining partner are arranged opposite one another in the joining position; joining together the first joining partner and the second joining partner in that the joining surfaces are brought into contact by a movement of the first component receptacle or of a part of the first component receptacle or of the second component receptacle or of a part of the second component receptacle. To this end, a joining unit can be provided, for example, which brings the joining surface of the first joining partner into contact with the joining surface of the second joining partner by a movement of the first component receptacle or of a part of the first component receptacle along the first axis of rotation. Furthermore, the joining surface of the second joining partner could also be brought into contact with the joining surface of the second joining partner by a movement of the second component receptacle or of a part of the second component receptacle along the first axis of rotation. Moreover, other constellations or even movements on both sides are also conceivable (e.g., as a result of each component receptacle having a joining unit); and unloading the connected joining partners.

The component receptacles can each preferably receive multiple joining partners, in particular two, three or four joining partners each. Accordingly, the component receptacles can also have multiple component seats. This results in the advantage that the joining partners can be loaded, heated, joined together and unloaded in parallel or quasi-simultaneously.

Advantageously, the unloading and loading of the component receptacles with joining partners can especially be carried out parallel to the warming, wherein at least one joining partner is warmed while the component receptacle is loaded in parallel with another joining partner and/or two connected joining partners are unloaded or a finished plastic product is unloaded.

According to aspects of embodiments a radar or lidar sensor for detecting the surroundings for a vehicle or a means of transportation may include a sensor unit having a housing. The housing comprises two joining partners which have been joined together with a device according to an embodiment or by means of a method according to an embodiment.

Within the meaning of the application, "along the axis of rotation" is in particular understood to be in the direction of the axis of rotation or the longitudinal extension of the axis of rotation. For example, this means that if the axis of rotation runs centrally through the component receptacle or the turntable of the component receptacle, the component nests or component seats which are arranged in the outer region of the turntable can be moved by a joining stroke along the axis of rotation (i.e., in the direction of the axis of rotation, that is to say for instance perpendicularly or orthogonally to the turntable) in order to bring about the joining together or contacting of the joining partners.

Advantageously, embodiments of the present application enable a method and a device, with which two non-transparent plastic parts can also be welded using a laser as the energy or heat source (laser welding). The application can be optimized, in terms of its deployment in series production, for the material flow and the cycle time, in a simple and cost-effective manner: thanks to the special configuration of the device, the latter can be optimized for serial operation in that the individual processes are made parallel (quasi-simultaneous). In particular, the method is also suitable for welding assemblies having electronics inside, since these are not damaged by the connection process according to the embodiments.

Furthermore, this is a particle-free process, wherein known ESD requirements are observed. Consequently, the robustness of the laser technology can be advantageously utilized for welding plastics, regardless of the transparency of a joining partner. A selective heat path can be formed at the weld interface. In addition, the flexibility of the technology in the event of changes to the part design is increased, with no additional tool changes or new tooling being necessary.

In addition, aspects of the embodiments can be deployed, for example, in the following areas (this is explicitly not an exhaustive list): automotive, aerospace, medical technology, electronics and, moreover, in all areas in which two plastic parts have to be welded in order to develop their function. As a consequence, the present application makes a very particular contribution in the field of (laser) welding plastic parts.

BRIEF DESCRIPTION OF THE DRAWINGS

The embodiments will now be explained in greater detail below with reference to the accompanying drawings, in which.

DETAILED DESCRIPTION OF THE EMBODIMENTS

Figure 1:
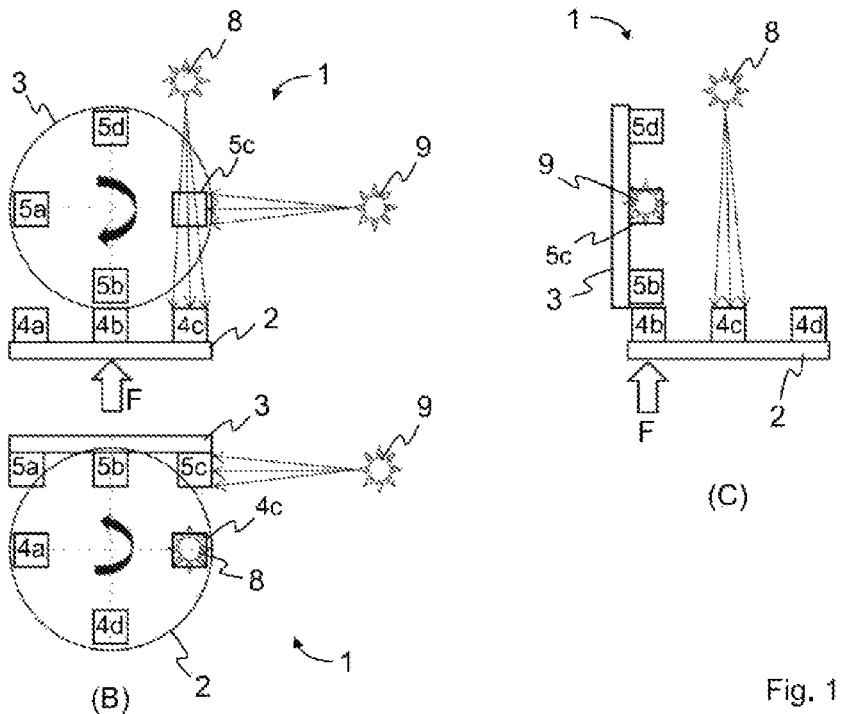
FIG. 1 is a diagram illustrating a device according to an embodiment.
Figure 2:
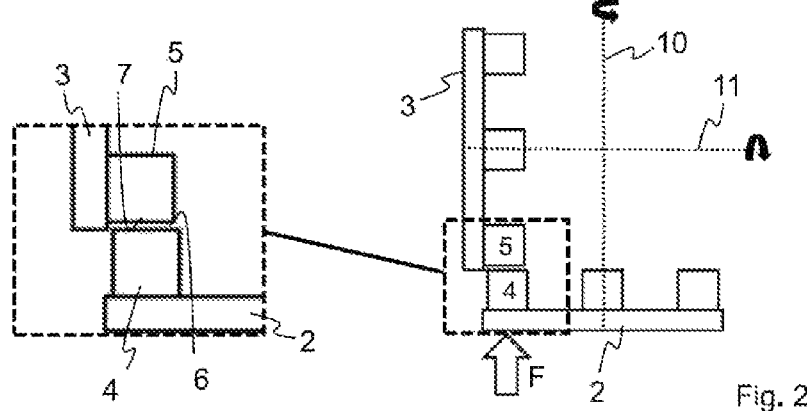
FIG. 2 is a diagram illustrating a rotated view of device according to an embodiment.

FIG. 1 is a diagram illustrating a device according to an embodiment and FIG. 2 is a diagram illustrating a rotated view of device according to an embodiment.

The device 1 comprises two positioning systems or a first component receptacle 2 and a second component receptacle 3 which can also be referred to here as the horizontal receptacle and the vertical receptacle due to the arrangement. The first component receptacle 2 serves to receive the first joining partner 4 and the second component receptacle 3 serves to receive a second joining partner 5. Furthermore, the first component receptacle 2 and the second component receptacle 3 are configured in such a way that these can each receive four components or joining partners 4a-4d or 5a-5d. The device 1 is configured to join together the joining partners 4, 5 produced from plastic along a surface, the joining surface. The joining surface is created from joining surfaces 6, 7 of the joining partners 4, 5, at which the joining partners 4, 5 are connected to one another. The joining surfaces 6, 7 can form a continuous surface or have interruptions or elevations. For the joining process, the device 1 comprises a first heat source in the form of a laser 8, which is arranged in order to heat the joining surface 6 of the first joining partner 4, and a second heat source in the form of a laser 9, which is arranged in order to heat the joining surface 7 of the second joining partner 5, i.e., the joining surfaces 6, 7 are warmed so that the latter melt or partially fuse, if necessary, in order to then be welded to one another.

The first component receptacle 2 is arranged so as to be rotatable about a first axis of rotation 10 and the second component receptacle 3 is arranged so as to be rotatable about a second axis of rotation 11. The rotation is depicted in the figures by the thick black arrows, wherein the direction of rotation can be specified depending on the application. Consequently, since the component receptacles 2, 3 can each receive four components or joining partners, the component receptacle 2, 3 must be rotated by approximately 90 degrees about the respective axis of rotation for a position change. The first component receptacle 2 is arranged at least substantially perpendicularly to the second component receptacle 3, i.e., the installation planes of the flat component receptacles 2, 3 are arranged substantially orthogonally to one another, such that the first axis of rotation 10 and the second axis of rotation 11 are also arranged substantially perpendicularly or at right angles (+/–a component tolerance of 0 degrees to 5 degrees, in particular of 0 degrees to 3 degrees) to one another. The first component receptacle 2 as well as the second component receptacle 3 each have a heating position in which the respective joining partners 4, 5 are arranged with respect to the corresponding lasers 8, 9 in such a way that the joining surfaces 6, 7 thereof can be heated by the lasers 8, 9 (depicted in the figures by the thin black arrows).

Furthermore, the first joining partner 4 and the second joining partner 5 are brought together following the heating in that a joining position is provided in which the joining surfaces 6, 7 of the first joining partner 4 and of the second joining partner 5 are arranged opposite one another. To this end, the first component receptacle 2 is rotated about the first axis of rotation 10 by 90 degrees such that the first joining partner 4 is situated in the joining position, and the second component receptacle 3 is rotated by 90 degrees about the second axis of rotation 11 such that the second joining partner 5 is also situated in the joining position such that the joining surfaces 6, 7 are arranged opposite one another, as depicted in greater detail in FIG. 2. The joining surfaces 6, 7 can then be brought together in that the first component receptacle 2 or a part of the first component receptacle 2 is arranged movably along the first axis of rotation 10, wherein the first joining surface 6 is brought into contact with the second joining surface 7 of the second joining partner 5 by a movement (depicted by the white arrow) of the first component receptacle 2 or of a part of the first component receptacle 2 along the first axis of rotation 10.

Figure 3:
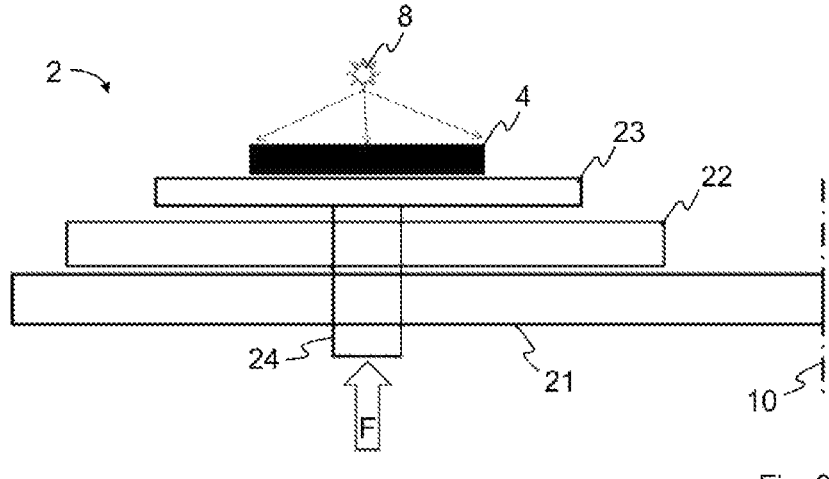
FIG. 3 is a diagram illustrating a horizontal view of a device according to an embodiment.

FIG. 3 is a diagram illustrating a horizontal view of a device according to an embodiment.

The horizontal receptacle or first component receptacle 2 comprises, as depicted in FIG. 3, a (horizontally arranged) turntable 21 which is arranged so as to be rotatable about the first axis of rotation 10, if necessary, a base plate 22 for a component seat, a component seat 23 which carries the first joining partner, and a piston 24 for the introduction of forces and, therefore, for the joining movement (joining stroke) which can be driven, e.g., via a motor or hydraulically. The forces are preferably introduced (depicted by the arrow F) from below by a joining unit which is mounted in a stationary manner. The first component receptacle 2 consequently comprises a guided component receptacle in order to guarantee a precise joining stroke, i.e., here, the entire component receptacle 2 is not moved along the first axis of rotation 10 in the direction of the second joining partner, but rather only the component seat 23 with the first joining partner 4.

Figure 4:
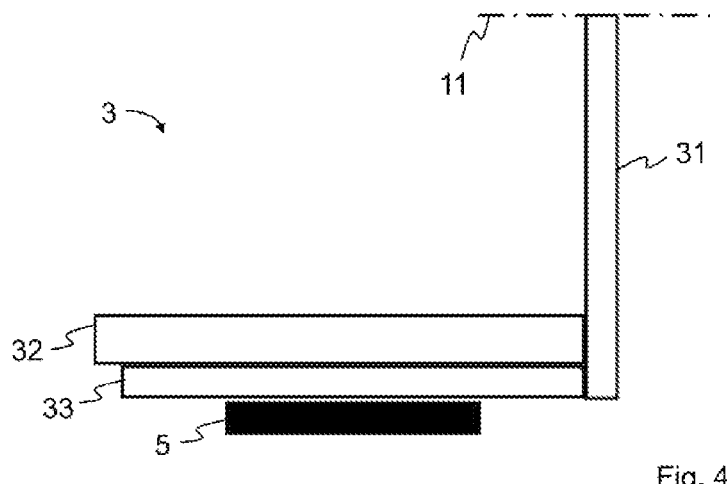
FIG. 4 is a diagram illustrating a device according to an embodiment.

FIG. 4 is a diagram illustrating a device according to an embodiment.

The vertical receptacle or the second component receptacle 2 comprises, as depicted in FIG. 4, a (vertically arranged) turntable 31 which is arranged so as to be rotatable about the second axis of rotation 11, if necessary, a base plate 32 for a component seat and a component seat 33 which carries the second joining partner 5. The component seat 33 is preferably configured in such a way that it comprises a suitable component fixing for receiving purposes (not depicted in the figures for the sake of clarity), e.g., a vacuum suction cap, a magnetic mechanism (in particular in the case of non-metallic plastics having permanent magnetic properties or magnetic materials encapsulated with plastic) or a clamping mechanism in order to hold the component or the second joining partner 5 and to counteract gravity and centrifugal force.

In this case, the joining movement is explicitly not limited to a joining movement from "bottom to top" (based on the representation in the figures): in particular, the first component receptacle could also be arranged vertically and the second component receptacle could also be arranged horizontally so that the joining movement would be directed from "top to bottom" (based on the representation in the figures, this would mean that joining partner 5 with component receptacle 33 would be pressed down against joining partner 4). Moreover, it is also possible for both component receptacles to each perform a joining movement (successively or simultaneously) by means of a joining unit, i.e., a movement on both sides, wherein each component receptacle has, e.g., a joining unit.

The process of separating the individual processes into individual process stations makes possible cycle time-optimized serial operation, since e.g., the unloading and loading of the component receptacles 2, 3 run parallel to the (laser) heating-up process (so to speak quasi-simultaneously). Furthermore, the existing methods for welding plastics of non-transparent parts (e.g., hot gas welding or infrared welding), in which the energy source does not touch the welding surface, are not able to focus the energy or the heat directly on the welding surface. In contrast, the disadvantage of the methods which are able to focus the energy/heat directly on the welding surface (e.g., ultrasonic welding or friction welding) is that that they can generate a good many particles and/or potentially damage electronic components when the assembly contains the latter. In contrast, the proposed application relates in particular to a selective plastic welding method in which the energy/heat is focused directly on the welding boundary area or the joining surface (s).

The method according to an embodiment comprises the method steps of laser warming (heating), positioning or rotating (switching), clamping and cooling as well as loading/unloading the components or joining partners.

In the case of laser warming, the two parts to be welded or joining partners 4, 5 are heated up or warmed. The warming should be carried out specifically at the right angle for each joining partner—to this end, the lasers 8, 9 can be arranged accordingly or can also be embodied to be movable. Separate laser equipment is therefore provided for each joining partner 4, 5 so that the necessary process parameters can be set selectively and independently. In addition, a monitoring system, e.g., in the form of thermal imaging cameras (not depicted in the figures), can be adapted in each case in order to monitor the two heating-up processes and to recognize any negative influences which can occur.

After the heating-up has ended, in particular after the laser has been switched off, both joining partners 4, 5 are moved into the joining position during positioning with a rotating movement (via the rotary indexing plate or turntable 21, 31) until the two warmed joining partners 4, 5 face one another, but do not yet touch (i.e., the component receptacles 2, 3 are each rotated by 90 degrees to this end).

A joining unit is expediently provided, which then allows the optimal "clamping process" of the fused surfaces to be set (clamping) and monitored in the joining position with variable joining speeds and joining forces. The joining partners 4, 5 must remain in this state (i.e., remain pressed against each other) until the heated material can no longer be deformed by itself or due to the lack of pressure between the components, and the two components have consequently become permanently firmly bonded (cooling). In this case, active cooling (e.g., by means of airflow cooling) can also be provided.

During loading and unloading, the two joining partners for the automated material flow are preferably inserted by suitable handling systems, e.g., industrial robots or axis gantries in a free component receptacle (e.g., in the figures at the position of the component seat for joining partners 4c/4d or 5c/5d-depending on the number of component seats used and depending on the positioning system used).

Figure 5:
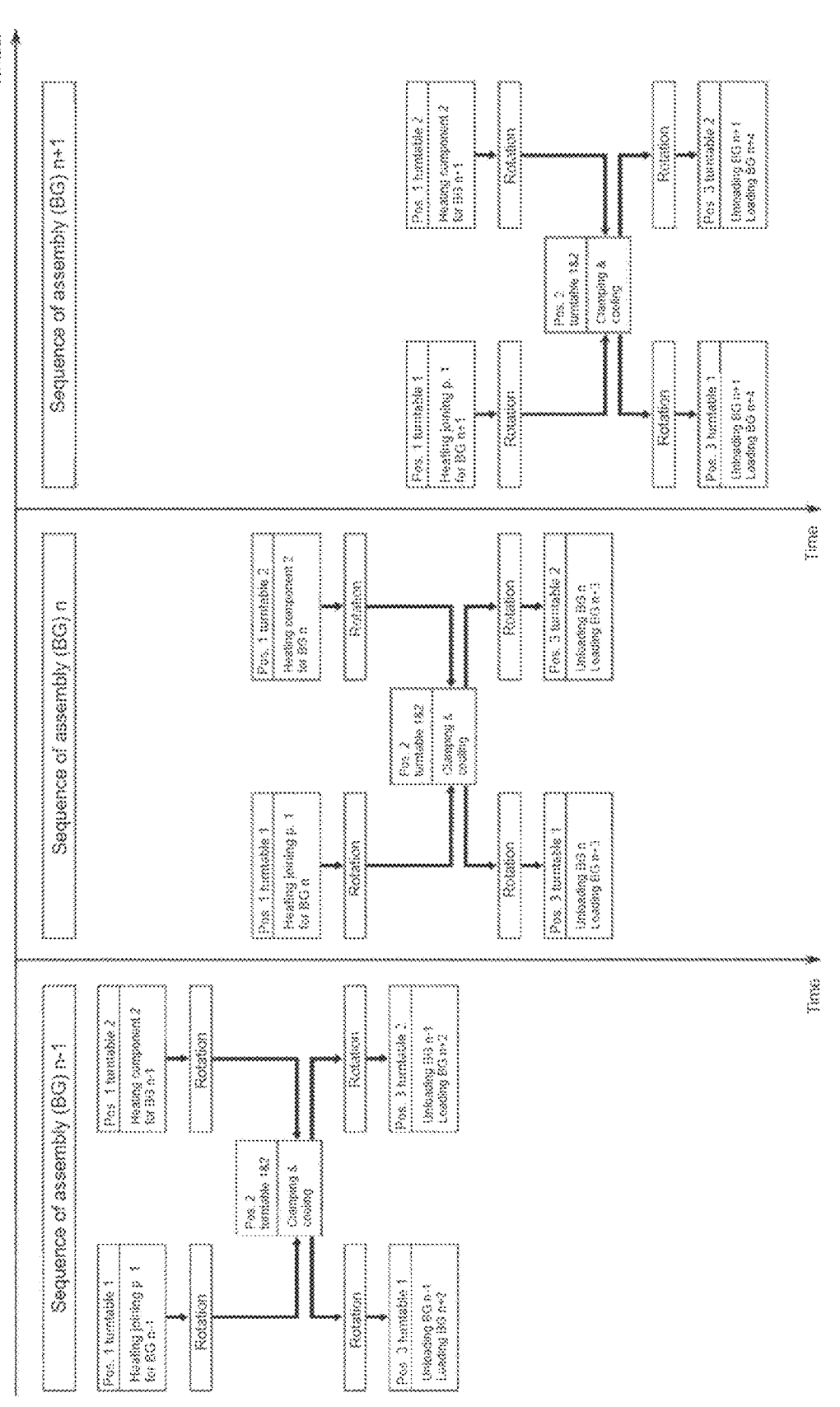
FIG. 5 is a flowchart illustrating a method of a device according to an embodiment.

FIG. 5 is a flowchart illustrating a method of a device according to an embodiment.

FIG. 5 shows, by way of example, a flowchart of the method according to an embodiment for a system or a device having two component receptacles, in which each component receptacle can receive three components or joining partners, i.e., has three component seats in each case. For a position change, the respective turntable is consequently rotated by 120 degrees.

Furthermore, it is also conceivable that, instead of the two turntables 21, 31, other goods carrier circulation systems are used (such as, e.g., a freely programmable drive system having linear motor technology, on which, e.g., a variable number of "movers" can travel independently of one another in an endless loop). The number of the component seats 23, 33 used (so-called "stations" or "nests") on the turntables 21, 31 as well as the directions of rotation of the goods carrier systems can be variably selected and adapted to the application. The spatial arrangement/orientation of the joining structure in the space is variable and can likewise be adapted to the respective application.

The invention claimed is:

1. A device for joining together a first joining partner and a second joining partner the device comprising:
   a first heat source configured to heat a first joining surface of the first joining partner;
   a second heat source configured to heat a second joining surface of the second joining partner;
   a first component receptacle configured to receive the first joining partner, the first component receptacle configured to rotate around a first axis of rotation;
   a second component receptacle configured to receive the second joining partner, the second component receptacle configured to rotate around a second axis of rotation perpendicular from the first axis of rotation; and
   a joining unit configured to control the first component receptacle to rotate around the first axis of rotation and the second component receptacle around the second axis of rotation to position the first jointing surface into contact with the second joining surface.

2. The device according to claim 1, wherein the joining unit is configured to position the first joining surface into contact with the second joining surface by positioning the first component receptacle along the first axis of rotation or along the second axis of rotation.

3. The device according to claim 2, wherein the joining unit is configured to position the first joining surface into contact with the second joining surface by positioning the second component receptacle along the first axis of rotation or along the second axis of rotation.

4. The device according to claim 3, wherein the first heat source comprises a first laser and e second heat source comprise a second laser.

5. The device according to claim 4, wherein the first joining partner comprises a plurality of first joining partners disposed around a first periphery of the first component receptacle and the second joining partner comprises a plurality of second joining partners disposed around a second periphery of the second joining receptacle.

6. The device according to claim 5, wherein the first component receptacle comprises a first turntable and the second component receptacle comprises a second turntable.

7. The device according to claim 6, wherein the first component receptacle comprises a first component seat and the second component receptacle comprises a second component seat.

8. The device according to claim 7, wherein the first component seat and the second component seat comprise a vacuum suction cap, a magnet mechanism or a clamping device configured to hold a joining partner.

9. The device according to claim 8, wherein the joining unit comprises a piston.

10. The device according to claim 9, wherein the joining unit comprises a motor-driven or a hydraulic drive.

11. The device according to claim 10, wherein the first component receptacle is arranged horizontally and the second component receptacle is arranged vertically.

12. The device (4) according to claim 1, further comprising a thermal imaging camera configured to monitor temperature of the first joining partner and the second joining partner.

* * * * *